Nov. 3, 1931.  G. C. MONCKMEIER  1,829,940
WEAR COMPENSATING BOLT
Original Filed Sept. 13, 1926  2 Sheets-Sheet 1
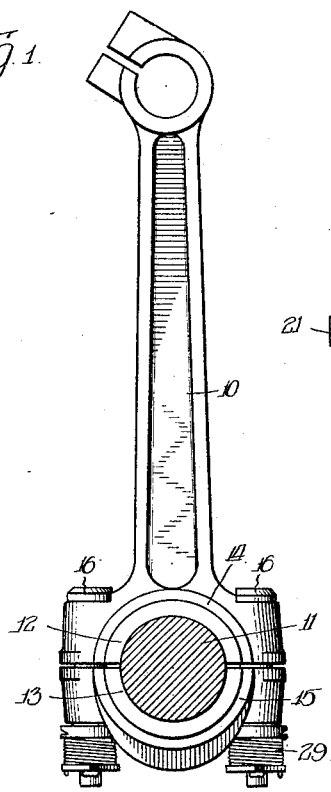
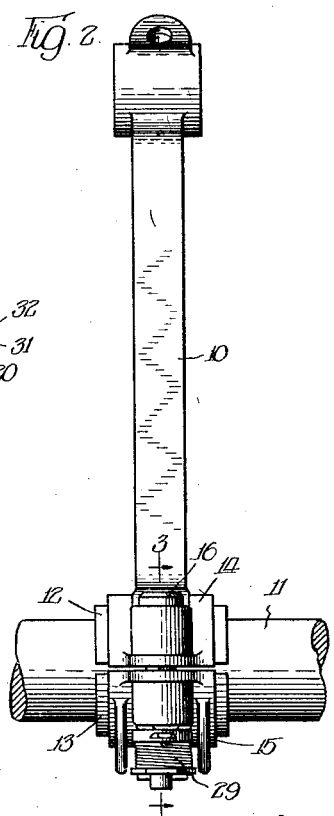
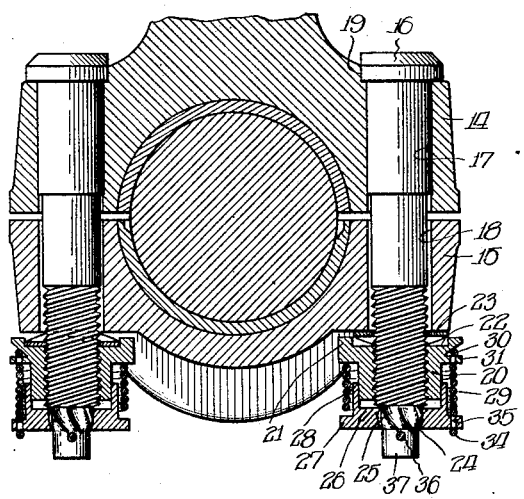
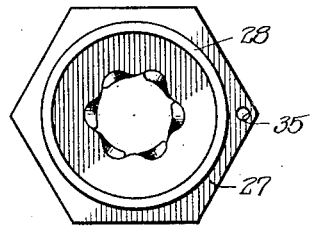
Inventor:
Gustav C. Monckmeier Nov. 3, 1931.  G. C. MONCKMEIER  1,829,940

WEAR COMPENSATING BOLT

Original Filed Sept. 13, 1926   2 Sheets-Sheet 2

Inventor:
Gustav C. Monckmeier,

Patented Nov. 3, 1931

1,829,940

UNITED STATES PATENT OFFICE

GUSTAV C. MONCKMEIER, OF CHICAGO, ILLINOIS

WEAR COMPENSATING BOLT

Original application filed September 13, 1926, Serial No. 135,167. Divided and this application filed August 5, 1927. Serial No. 210,845.

The present invention has to do with wear compensating bolts of the type in which the nut is automatically advanced on the bolt by a spring as wear occurs between the parts clamped by the bolt.

The principal object of the invention is to provide an improved bolt of the type described in which the spring may be wound up and held at any desired tension in an extremely simple manner.

Another important object is to provide a bolt in which the connection between the nut and one end of the spring is positioned near the front end of the nut without interrupting the annular continuity of the front face of the same.

Still another important object is to provide a bolt in which a cap encloses the spring and forms an anchorage for one end of the same, and the connection between the cap and that end of the spring is such as to preclude binding or distortion of the spring in operation.

Other objects and advantages of the invention will be apparent to those skilled in the art upon a full understanding of the construction, arrangement, and operation of the improved bolt.

For the purpose of exemplification, preferred structural forms of the several features of the invention are presented herein, but it will of course be understood that such features are susceptible of embodiment in other structural forms coming equally within the comprehensive scope of the appended claim.

In the drawings:

Fig. 1 is a side view of a connecting rod equipped with two of the bolts of the invention;

Fig. 2 is another side view of the rod shown in Fig. 1;

Fig. 3 is an enlarged fragmentary section through the crank shaft bearing of the rod, taken on the line 3—3 of Fig. 2;

Fig. 4 is a section through one of the nuts shown in Fig. 3;

Fig. 5 is a section through one of the washers shown in Fig. 3;

Fig. 6 is an end view of the washer shown in Fig. 5;

Figure 7:
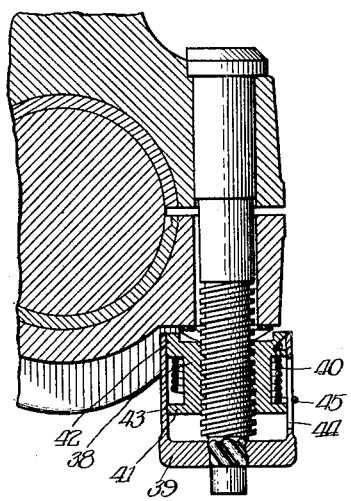
Fig. 7 is a fragmentary section which corresponds generally to Fig. 3 but shows certain modifications.

The bolt construction illustrated in Figs. 1 to 6 inclusive will first be described. The bolt is shown therein as applied to the crank-shaft bearing of a connecting rod 10. The crank-shaft 11 is journaled between two semi-cylindrical bearing members 12 and 13 which are held in position about the crank-shaft by the lower end 14 of the connecting rod and a bearing cap 15 which is detachably secured to the lower end 14 of the rod by means of two wear compensating bolts 16 constructed in accordance with the invention. Inasmuch as the blots 16 are duplicates of each other, only one of the same will be described.

The bolt 16 extends through two aligned apertures 17 and 18 in the parts 14 and 15 of the bearings, and is prevented from turning therein by a flat side 19 on the otherwise round head of the bolt, which flat side seats contiguously against a flat shoulder formed in the part 14. The shank of the bolt is threaded near the lower end thereof, and a nut 20 is mounted on the threaded portion. The nut 20 is of cylindrical form, and is provided at its front end with a radial flange 21 which is centrally recessed at 22 to provide a seat for a reaction spring 23 such as that which forms the subject matter of my Patent No. 1,585,309. The shank of the bolt is provided beyond the threaded portion with a portion 24 of non-circular, generally star-like cross section, which is produced by the formation thereon of a plurality of ribs 25, preferably about six in number, which extend diagonally in the direction shown. A washer 26 having a central bore of substantially the same shape as the portion 24 of the shank of the bolt is seated on the portion 24, and is provided, inwardly of the hexagonal or otherwise shaped periphery 27 thereof, with a sleeve 28 which telescopes over the lower end of the nut 20.

A coil spring 29 encircles the nut 20 and the washer 26 between the flanges 21 and 27 thereof, and is secured at its opposite ends to such flanges; one end 30 of the spring being hooked through an aperture 31 in the flange 21 into a slot 32 which is cut into the periphery of the flange 21 at a point spaced from the front face 33 of the nut; and the other end 34 of the spring being hooked through an aperture 35 in the flange 27 of the washer. The front face 33 of the nut must resist considerable wear in the operation of the bolt, and, by seating the end 30 of the spring in the slot 32, the front face is left entirely intact throughout its circumference.

When the bolt assembly has been applied to a bearing, and it is desired to place the spring 29 under tension in order to cause the nut 20 to advance automatically along the bolt as wear occurs between the parts clamped, the washer 26 seated on the portion 24 of the shank of the bolt is turned by hand in a clock-wise direction and winds up the spring. The peculiar shaping of the cooperating portions of the washer and bolt constitutes a ratchet-like connection between such elements, and, when the washer is turned to wind up the spring, it is automatically cammed back and forth axially of the portion 24 by the inclination of the ribs 25, and, when released, will be drawn automatically against the end of the threaded portion of the shank by the action of the spring and held against reverse movement. In order to unwind the spring, it is merely necessary to draw the washer a short distance toward the end of the bolt, whereupon the ratchet-like connection will disengage.

The ratchet-like connection between the washer and the shank of the bolt will always cause the washer when released to lock securely in any desired position of adjustment to which it is turned in tensioning the spring; and it is not necessary for the person installing the bolt assembly to shift the washer axially of the shank in order to lock it, as in my co-pending application filed March 12th, 1926, Serial Number 94,136, nor is it necessary for the washer to be brought to rest in an observable position in which cotter pin apertures are in exact alignment, as in ordinary wear compensating bolts. The torsion applied against the washer 26 in a counter-clockwise direction by the wound spring 29 always tends to maintain the washer in its locked position, but, as an added safety factor, a cotter pin 36 is provided, which pin is inserted through an aperture in the circular tip 37 on the shank of the bolt beyond the portion 24, the pin 36 being inserted only after the washer 26 has been turned into a position giving the desired tension on the spring 29.

Figure 8:
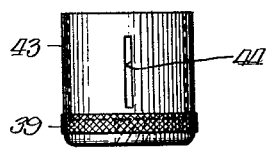
Fig. 8 is a side view of the cap-shaped washer shown in Fig. 7.
Figure 9:
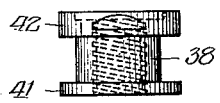
Fig. 9 is a side view of the nut shown in Fig. 7.

In Figs. 7 to 9 inclusive is shown a modified form of the bolt, which, with the exception of certain changes in the nut 38, the washer 39 and the coil spring 40, is substantially the same as shown in Fig. 3. The nut 38 is provided with a flange 41 at the lower end thereof which is of substantially the same diameter as the flange 42 at the upper end, and the coils of the spring 40 are all disposed between such flanges. The washer 39 is provided adjacent its periphery with a sleeve 43 which extends about the flanges 41 and 42 of the nut and encloses the coils of the spring 40. The sleeve 43 of the washer is provided at one side thereof with an axially elongated slot 44, and the lower end 45 of the spring 40 is hooked through such slot. As the nut 38 slowly advances along the bolt in compensating for the wear occurring between the parts clamped together, the nut shifts axially with relation to the sleeve 43 of the washer, and the hooked end 45 of the spring gradually shifts its position along the edge of the slot 44, thereby preventing any binding or extortion of the spring such as might otherwise occur were the connection between the end 45 of the spring and the sleeve 43 of the washer not a sliding one. The bolt shown in Figs. 7 to 9 inclusive is provided with two square threads, which gives a steep pitch to the threading.

This application is a division of my co-pending application, Serial No. 135,167 filed September 13, 1926.

I claim:

In a device of the class described, a threaded bolt having inclined ribs on the shank thereof beyond the threaded portion, a nut screwed on the bolt, a washer seated on the ribbed portion of the shank and having a bore of generally similar cross section, and a coil spring secured at its opposite ends to the nut and the washer for turning the nut, said inclined ribs on the bolt and the co-operating bore of the washer affording a ratchet-like connection between the washer and the bolt which permits the washer to be turned in one direction to wind up the spring and holds the washer automatically against movement in the opposite direction when released.

In testimony whereof I have hereunto subscribed my name.

GUSTAV C. MONCKMEIER.